SIGNAL TRANSLATING METHOD

Original Filed Oct. 21, 1954 6 Sheets-Sheet 1

CARL G. EILERS
ERWIN M. ROSCHKE
*INVENTORS.*

Francis W. Crotty

THEIR ATTORNEY.

CARL G. EILERS
ERWIN M. ROSCHKE
*INVENTORS.*

BY Francis W. Crotty

THEIR ATTORNEY.

INVENTORS:
CARL G. EILERS
ERWIN M. ROSCHKE
BY
Francis W. Crotty
THEIR ATTORNEY.

INVENTORS:
CARL G. EILERS
ERWIN M. ROSCHKE
BY Francis W. Crotty
THEIR ATTORNEY.

Feb. 14, 1961 C. G. EILERS ET AL 2,972,010

SIGNAL TRANSLATING METHOD

Original Filed Oct. 21, 1954 6 Sheets-Sheet 5

CARL G. EILERS
ERWIN M. ROSCHKE
*INVENTORS.*

BY Francis W. Crotty

THEIR ATTORNEY.

CARL G. EILERS
ERWIN M. ROSCHKE
*INVENTORS.*

BY Francis W. Crotty

THEIR ATTORNEY.

2,972,010

SIGNAL TRANSLATING METHOD

Carl G. Eilers, Fairbury, and Erwin M. Roschke, Des Plaines, Ill., assignors to Zenith Radio Corporation, a corporation of Delaware Original application Oct. 21, 1954, Ser. No. 463,702. Divided and this application Oct. 22, 1959, Ser. No. 847,965

4 Claims. (Cl. 178—5.1)

This invention relates to a method of translating an intelligence signal in a secrecy communication system, namely a system wherein an intelligence signal is transmitted in coded form to be utilized only in receivers equipped with decoding devices controlled in accordance with the code schedule employed at the transmitter. Since the invention may be practiced in either a transmitter or a receiver, the term "encoding" is used herein in its generic sense to encompass either coding at the transmitter or decoding at the receiver. This is a division of copending application Serial No. 463,702, filed October 21, 1954, and issued August 2, 1960, as Patent 2,947,804.

In a copending application of Jack E. Bridges, Serial No. 326,107, filed December 15, 1952, and issued February 11, 1958 as Patent 2,823,252, and assigned to the present assignee, there is disclosed a generator for producing a combination of code signal components each having a predetermined identifying characteristic. These components, which are randomly sequenced and randomly appearing within the combination to represent a code schedule determined by the particular random distribution of the components, are utilized to control the operation of the encoding apparatus of a secrecy communication system in the form of a subscription television system, in accordance with the code schedule.

The generator of the aforementioned copending Bridges application comprises a beam-deflection device which has a pair of deflection elements and a series of segmental anodes. A noise generator provides a deflection signal which has an instantaneous amplitude that varies at a random rate to effect random scanning of the segmental anodes by the electron beam. The beam is turned on and off to render it intermittently effective. A series of generating units are individually connected to one of the segmental anodes, and each is responsive to the impingement of the electron beam on the associated anode to develop a code signal burst of a particular characteristic frequency and a predetermined duration. Thus, the generating units produce a combination of code signal components of different frequencies distributed in accordance with the scanning of the anodes of the electron beam.

A generator disclosed in the present application realizes results somewhat similar to those achieved by the Bridges arrangement but in an entirely different and novel manner. Briefly, a series of signal generators, which individually produce a signal having a predetermined identifying characteristic, are actuated in a random sequence under the control of a multi-stable mechanism that may be likened to a "roulette wheel." This multi-stable mechanism is actuated between its operating conditions in response to a random signal which is applied during each of a series of predetermined trigger-time intervals; it is consequently established in a randomly selected operating condition at the termination of each such time interval. A corresponding randomly selected one of the generators is subsequently actuated in accordance with the operating condition of the multi-stable mechanism at the termination of each trigger interval to develop a series of code bursts or signal components individually having a predetermined identifying characteristic.

In the coding of a secrecy communication signal by means of these code signal components, it is sometimes desirable to employ in addition a series of periodically recurring signal components in order to increase the scrambling complexity. Moreover, for maximum coding it is desirable that the periodically recurring components do not exhibit a fixed time or phase relationship with respect to the code signal components. However, when these two somewhat independent groups of signal components are applied to the same coding apparatus, ambiguity or instability may result due to the possible simultaneous application of a periodically recurring signal component and a code signal component. In the present application, an encoding device is operated conjointly by periodically recurring signal components and code signal components which are synchronized so that none of the components interferes with any other.

When a multi-step counting device, such as a blocking oscillator, is used to produce the periodically recurring signal components, it is desirable to develop a series of randomly occurring reset pulses which are used to establish the counting device in a predetermined reference condition from time to time; this expedient insures synchronous operation between the transmitter and authorized receivers. However, if any of the reset pulses happen to occur just subsequent to the completion of a cycle of operation of the counter or during one of the early steps in the cycle, unstable operation may ensue because of the inherent limitations of many counting devices. In the present application, a multi-step counting device is reset by randomly occurring reset pulses only during certain ones of the various steps in the counting cycle of the device.

In accordance with one method concept of the invention, the code signal components, which constitute encoding signals and may be utilized for encoding a television signal, are produced by initially developing during a trace interval, such as a field trace, a first encoding signal representing predetermined coding information. During the same trace interval the coding information is stored. The stored coding information is subsequently read out during one of the retrace intervals, such as field retrace, to derive a second encoding signal, which may comprise the same or different code signal components, containing the coding information. In this manner, a complex coding schedule may be realized by utilizing a relatively long trace interval to develop it and yet the final encoding signal which represents the same complex coding schedule is developed during a relatively short retrace interval in order to facilitate complex mode changing during retrace.

It is, therefore, an object of the present invention to provide a novel method of translating a composite television signal.

It is another object of the invention to provide a method of translating an intelligence signal. In accordance with one aspect of the invention, this method is practiced by developing a plurality of code signal components, developing a control effect in response to certain ones only of the code signal components, encoding the intelligence signal in accordance with the control effect, developing from the control effect a modifying signal representing a selecting schedule, and selecting certain ones of the code signal components in response to the modifying signal.

The features of this invention which are believed to be new are set forth with particularity in the appended claims. The invention, together with further objects and advantages thereof, may best be understood, however, by reference to the following description when taken in conjunction with the accompanying drawings, in which:

Figure 1:
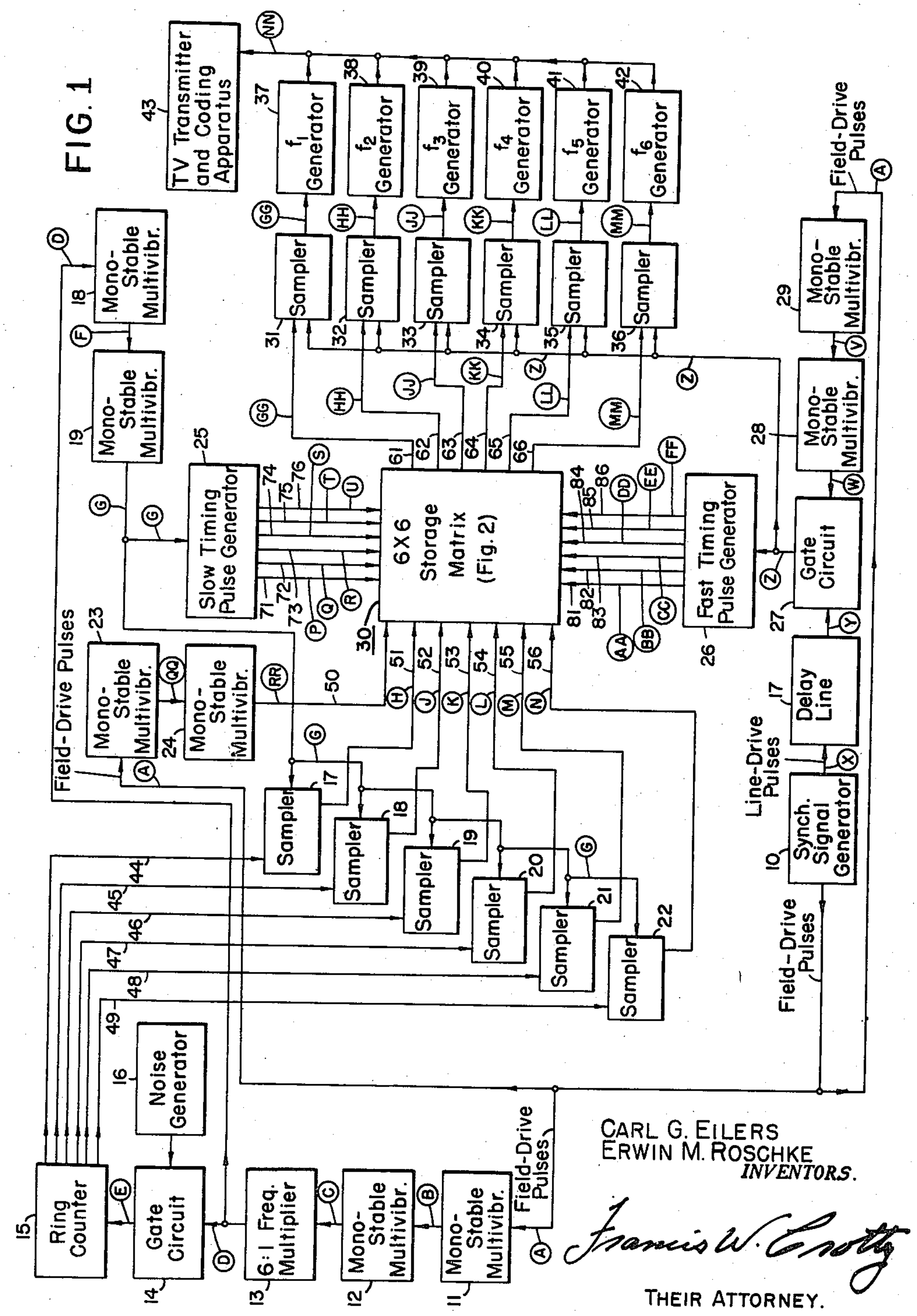
Figure 1 is a schematic representation of an encoding signal generator embodying the invention.

The encoding-signal generator of Figure 1 includes a conventional television synchronizing-signal generator 10 which has an output circuit connected to a mono-stable multivibrator 11 to supply field-drive pulses thereto. Multivibrator 11 is connected to another mono-stable multivibrator 12 having output terminals connected to the input circuit of a 6:1 frequency multiplier 13. A normally-closed gate circuit 14 has one input circuit connected to the output circuit of multiplier 13, another input circuit connected to a noise generator 16 which constitutes a source of random actuating signal and an output circuit connected to a multi-stable counting mechanism or ring counter 15. This counting mechanism or ring counter, which has a multiplicity of stable operating conditions, may be of conventional construction and operates in response to an applied pulse type actuating signal for sequential actuation between its stable operating conditions. A typical ring counter which may be incorporated into the generator of Figure 1 is shown and described in detail on page 24 of "High-Speed Computing Devices" by the Staff of Engineering Research Associates, Inc. and published by McGraw-Hill Book Company, Inc. in 1950. The ring counter disclosed in that publication has a multiplicity of intercoupled electron-discharge paths and operates in response to an applied actuating signal for rendering these paths conductive one at a time in a predetermined sequence.

As is well understood in the art, a multi-stable counting mechanism such as a ring counter advances from one stable operating condition to the next usually in a predetermined sequence and at any given instant it may be established in any one of its multiplicity of operating conditions as determined by the applied signal. For illustrative purposes in discussing the embodiment of Figure 1, it will be assumed that ring counter 15 comprises seven operating stages with seven stable operating conditions and is provided with six output circuits 44–49 for developing respective output signals in response to establishment of counter 15 in six of its stable operating conditions. For reasons to be discussed hereinafter, it is desirable to employ only six output circuits so that no output signal is developed when counter 15 is established in the remaining stable operating condition.

Output circuits 44–49 are connected to respective input circuits of a plurality of samplers 17–22. Frequency multiplier 13 is also connected to a pair of series-connected mono-stable multivibrators 18 and 19, and multivibrator 19 is parallel-coupled to additional input circuits of samplers 17–22. The output circuits of samplers 17–22 are connected to one series of input circuits, 51–56 respectively, of a 6 x 6 storage matrix 30. This storage matrix, which is illustrated and described in detail in connection with Figure 2, has another series of input circuits 71–76 individually connected to an output circuit of a slow-timing pulse generator 25. This generator has its input circuit connected in turn to the output circuit of multivibrator 19 and may be constructed in a manner very similar to that of ring counter 15 in that it may have a multiplicity of stable operating conditions and be advanced from one condition to the next in response to each applied pulse.

A mono-stable multivibrator 29 is also connected to synchronizing-signal generator 10 to derive field-drive pulses therefrom and the output circuit of this multivibrator is connected to a mono-stable multivibrator 28. A normally-closed gate circuit 27 has one input circuit connected to synchronizing-signal generator 10 through a delay line 17 to derive delayed line-drive pulses, another input circuit connected to the output terminals of mono-stable multivibrator 28, and an output circuit connected to a fast-timing pulse generator 26, which is similar in construction to generator 25. Generator 26 similarly has a series of output circuits connected to a series of input circuits 81–86 of 6 x 6 storage matrix 30.

Storage matrix 30 has a series of output circuits 61–66 connected respectively to input circuits of a series of samplers 31–36, these samplers also having input circuits parallel-connected to the output circuit of normally-closed gate circuit 27. The output circuits of samplers 31–36 are connected respectively to a plurality of signal generators 37–42, each of these generators producing a signal having a predetermined distinctive frequency characteristic $f_1$–$f_6$ respectively. The output circuits of generators 37–42 are connected in common to the input terminals of a unit 43 that includes a conventional television transmitter equipment along with suitable coding apparatus, as for example described in the above-identified Bridges application.

In order to reset storage matrix 30 to an initial reference condition, a mono-stable multivibrator 23 is connected to synchronizing-signal generator 10 to derive field-drive pulses therefrom, and this multivibrator is connected to the input circuit of a mono-stable multivibrator 24. The output circuit of multivibrator 24 is connected to an additional input circuit 50 of storage matrix 30 for reset purposes.

Figure 2:
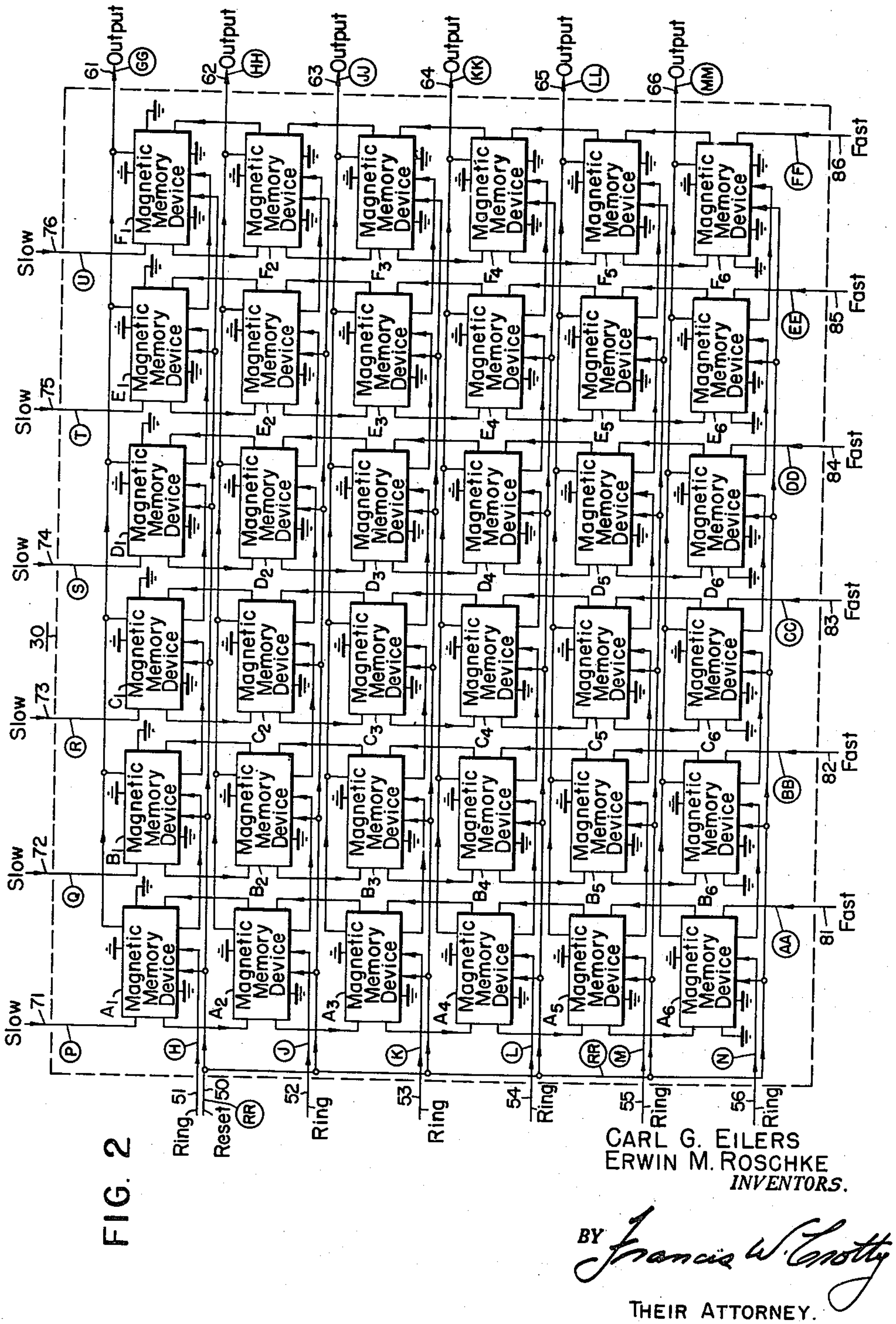
Figure 2 is a detailed schematic representation of a portion of the generator of Figure 1.

Storage matrix 30 is shown in more detail in Figure 2 and comprises thirty six magnetic memory devices, designated A1–F6, arranged in six rows 1–6 and six columns A–F. Each memory device is located at a specific cross point in the 6 x 6 matrix and has one ("slow") input circuit coupled to a selected one of input circuits 71–76 from slow timing pulse generator 25, another ("fast") input circuit coupled to a selected one of input circuits 81–86 from fast-timing pulse generator 26, another ("ring") input circuit coupled to a selected one of input circuits 51–56 from samplers 17–22, still another ("reset") input circuit coupled to reset conection 50 from multivibrator 24, and one of a plurality of output circuits 61–66 individually coupled to a selected one of samplers 31–36.

Figure 5:
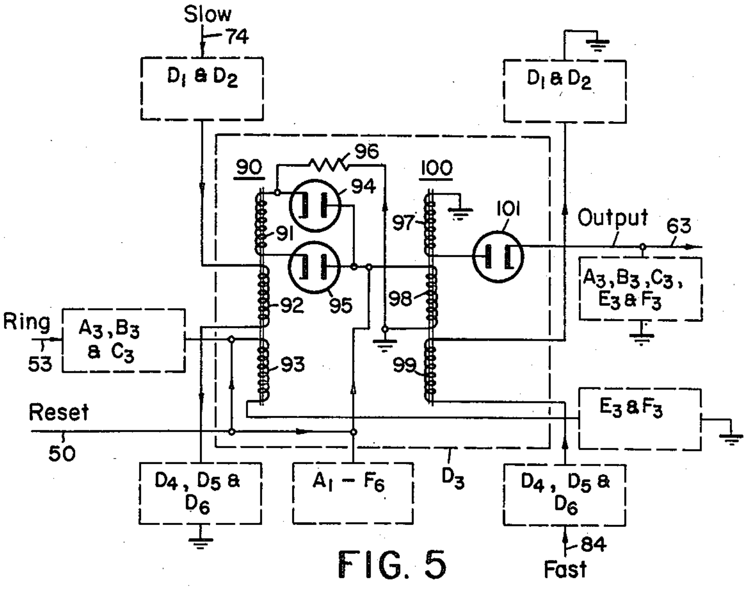
Figure 5 is a detailed schematic representation of a portion of the apparatus shown in Figure 2.

In order to facilitate a full appreciation of the construction of matrix 30 and the manner in which each one of memory devices A1–F6 accomplishes storage of "bits" of information, one of the memory devices has been shown in complete detail in Figure 5. Merely for illustrative purposes, memory device D3, which is similar in all respects to the other devices, has been selected. The D3 memory device includes an input transformer 90 and an output transformer 100 each having a ferromagnetic core which exhibits a substantially rectangular hysteresis loop as illustrated at 120 and 130 respectively in Figure 6. Transformer 90 comprises a pair of input windings 92 and 93 and an output winding 91, and transformer 100 similarly comprises input windings 98, 99 and an output winding 97. One terminal of input winding 92 of transformer 90 is connected to input circuit 74 from slow-timing pulse generator 25 through similar windings in memory devices D1 and D2, the other terminal of winding 92 being connected to ground through similar windings in memory devices D4, D5 and D6. One terminal of input winding 93 of transformer 90 is connected through similar windings in memory devices A3, B3 and C3 to input circuit 53 from sampler 19, and also to reset connection 50, and the other terminal of winding 93 is connected to ground through similar windings in memory devices E3 and F3. One terminal of output winding 91 of transformer 90 is connected through a diode 94 to one terminal of input winding 98 of transformer 100, and the other terminal of winding 91 is connected through a diode 95 to the same terminal of winding 98. The other terminal of winding 98 is connected to ground and also through a resistor 96 to the terminal of winding 91 connected to diode 94. Diodes 94, 95 and resistor 96 are employed to insure that current travels in one direction only through the circuit coupling windings 91 and 98. Moreover, diode 94 prevents "reverse" current flow from winding 98 to 91 even though it is in the right direction since diode 94 effectively serves as a short circuit across winding 91. Reset connection 50 is also connected to the ungrounded terminal of winding 98 and to all similar windings 98 and 93 of all the other memory devices A1–F6. One terminal of input winding 99 of transformer 100 is connected through similar windings in memory devices D4, D5 and D6 to input circuit 84 from fast-timing signal generator 26, and the other terminal of winding 99 is connected to ground through similar windings in storage devices D1 and D2. One terminal of output winding 97 of transformer 100 is connected to ground and the other terminal is connected through a diode 101 to output circuit 63, which is connected in parallel to all of the similar output windings of memory devices A3, B3, C3, E3 and F3 in the same row.

Figure 3:
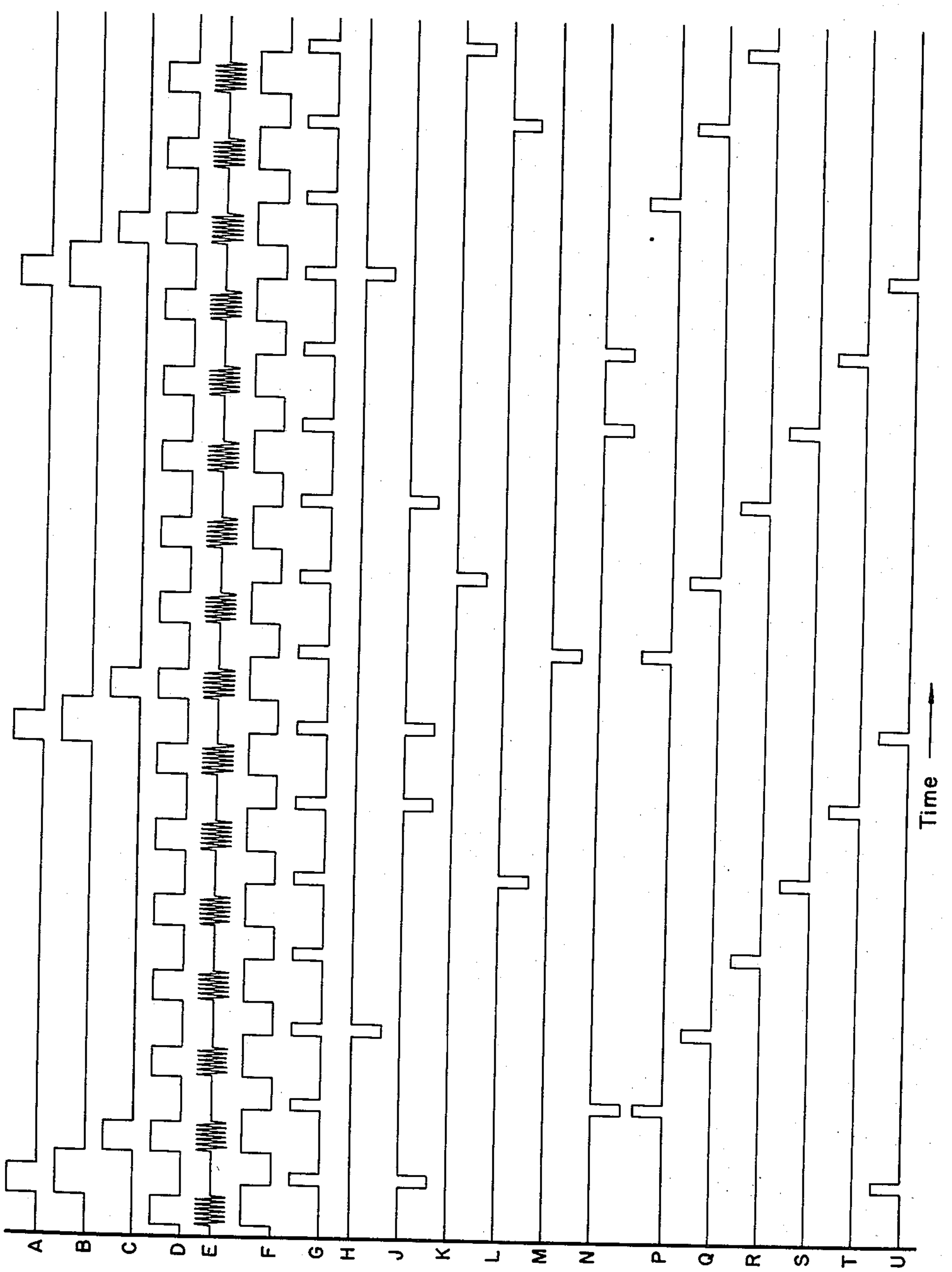
Figures 3 and 4 are graphical representations of certain waveforms which are useful in explaining the operation of the generator.
Figure 4:
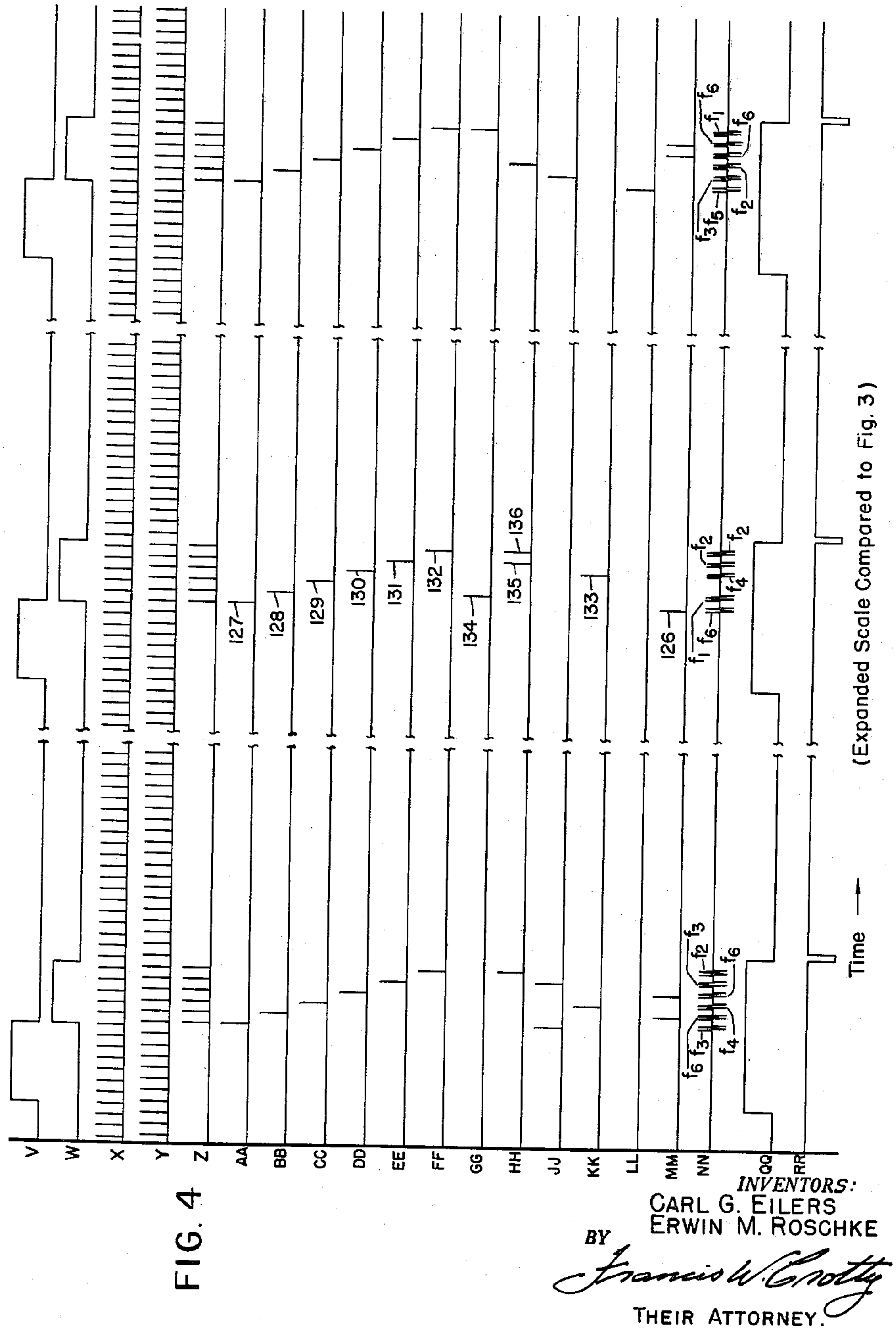

In order to simplify the detailed explanation of the operation of the invention, idealized signal waveforms appearing at various portions of the signal generator, indicated by encircled reference letters and shown on a non-linear time scale abscissa, are given corresponding letter designations in the graphical representations of Figures 3 and 4. In the operation of the generator of Figure 1, periodically recurring field-drive pulses (curve A) are supplied to mono-stable multivibrator 11 which is actuated from its normal operating condition to its abnormal operating condition in response to the leading edge of each applied pulse. The circuit parameters of multivibrator 11 are so chosen that it automatically returns to its normal operating condition at a time subsequent to the termination of the actuating field-drive pulse but prior to the leading edge of the ensuing field-drive pulse to develop the elongated pulses illustrated in curve B. These latter pulses are applied to mono-stable multivibrator 12 which is actuated in response to the trailing edges thereof from its normal operating condition to its abnormal condition, automatically returning to its normal operating condition at the end of a predetermined time interval to develop the series of pulses shown in curve C. As illustrated, the pulses of curve C have approximately the same duration as the field-drive pulses of curve A; however, it will be appreciated that such a relationship has been shown only for convenience and actually the pulses of curve C may be longer or shorter than those of curve A. These pulses are then applied to frequency multiplier 13 wherein they are multiplied on a 6:1 basis to develop the periodically recurring pulses of curve D, six pulses being produced in response to each applied pulse. Normally-closed gate circuit 14 which is continuously supplied with a random actuating signal from noise generator 16 is gated open or "turned on" in response to each pulse of curve D to supply periodically recurring bursts of noise energy (curve E) to ring counter 15.

Ring counter 15 is actuated between its multiplicity of operating conditions (seven for the case illustrated) in a predetermined sequence in response to the individual pulse excursions within each of the various bursts of noise energy so that at the termination of each of the bursts of curve E, which collectively define a series of spaced predetermined trigger-time intervals, counting mechanism 15 is established in a randomly selected operating condition. It will be appreciated that in order to actuate the ring counter in such random fashion, the applied signal need only exhibit some random characteristic so that the counter receives a random and different number of actuating pulses during each trigger-time interval. For example, instead of utilizing a noise signal source as shown, a generator producing a pulse signal having a constant pulse repetition frequency may be employed and different numbers of pulses may then be applied to the ring counter during each trigger-time interval. As hereinafter explained, the randomly selected condition of mechanism 15 is "read out" subsequent to the end of each burst of curve E, and storage apparatus 30 is actuated in accordance with this condition of counter 15.

Meanwhile, in order to provide a series of sampling pulses to facilitate the reading-out operation of ring counter 15, the pulses of curve D are supplied to a mono-stable multivibrator 18 to develop the elongated positive pulses shown in curve F. Mono-stable multivibrator 19 operates in response to the trailing edge of each positive pulse of curve F to develop a series of positive ring counter read-out pulses as shown in curve G. These read-out pulses are supplied in parallel to samplers 17–22, which may be considered as normally-closed gate circuits, in order to permit the operating condition of ring counter 15 at the termination of each burst of curve E, e.g., at the termination of each of the series of spaced predetermined trigger-time intervals, to be made known to storage matrix 30.

For convenience, an illustrative series of condition of ring counter 15 at the end of each time interval may be assumed. Specifically, it may be assumed that at the termination of the third burst of curve E (from the left) or after the third trigger-time interval and also at the termination of the 13th trigger time interval, the operating stage of ring counter coupled to output circuit 44 assumes a polarity condition opposite to that of all the other six stages in the counter so that negative pulses as shown in curve H are developed at the output terminals of sampler 17 and are applied over input circuit 51 to storage apparatus 30. Similarly, it may be assumed that at the termination of the first, sixth, seventh and tenth spaced trigger-time intervals, ring counter 15 is in such a condition that the polarity of the operating stage coupled to output circuit 45 is different than the polarity of all the other stages so that negative pulses as shown in curve J are produced at the output terminals of sampler 18 and supplied over input circuit 52 to storage matrix 30. In like manner, it may be assumed that the pulses shown in curve K are supplied to storage apparatus 30 over input circuit 53, the pulses of curve L over input circuit 54, the pulses of curve M over input circuit 55, and the pulses of curve N over input circuit 56.

As previously stated, only six of the seven operating stages of ring counter 15 are provided with output circuits; consequently, no pulses are supplied to the storage matrix at the termination of some of the trigger-time intervals. As will be shown, this arrangement facilitates not only a random distribution or sequence of components but also a random appearance of such components within the code signal combination. It may be assumed, for illustrative purposes, that at the termination of the fourth burst of curve E or fourth predetermined trigger time interval and also after the 14th trigger-time interval, the operating stage of counting mechanism 15 not coupled to an output circuit has a polarity different than all of the other stages so that no output pulse is developed after each of these trigger-time intervals. The pulses illustrated in curves H–N that occur between any two successive field-drive pulses of curve A constitute collectively a first encoding signal developed during a field-trace interval and representing predetermined coding information, as distinguished from a second encoding signal which is developed during a subsequent field-retrace interval and contains the same coding information, as will be explained hereinafter. The pulses of curves H–N are applied to the "ring" input circuits of the memory devices of rows 1–6 respectively (Figures 2 and 5).

Figure 6:
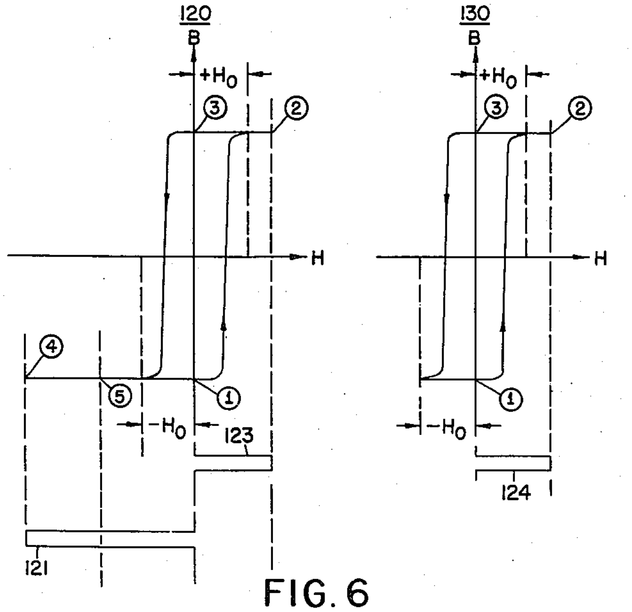
Figure 6 is a graphical representation of certain operating characteristics of the circuit shown in Figure 5.

To further explain, attention is directed to the graphical representations shown in Figure 6, wherein 120 represents the hysteresis loop of transformer 90 and 130 the hysteresis loop of transformer 100 of Figure 5, with flux density B plotted as a function of magnetomotive force H. These hysteresis loops characterize the magnetic properties of materials which are ideally suited for utilization in magnetic memory devices such as some of the nickel-iron alloys and certain of the ferrites as is well known in the art, and the corresponding transformers of all memory devices A1–F6 of matrix 30 have corresponding hysteresis characteristics. It will be seen from each curve that a coercive force of $\pm H_0$ is required to drive each magnetic core from complete saturation in one polarity to complete saturation in the opposite polarity, although it should be realized from the illustration that approximately $2/3H_0$ in either direction reaches virtual saturation. If a magnetic core is saturated at point one on either curve, a magnetomotive force less than $+2/3H_0$ will leave the core saturated in that condition. There is no net change in flux density. A magnetomotive force in excess of $+2/3H_0$, as for example that represented by pulse 123, will cause the core to be saturated in the opposite direction as represented by points two and three on loops 120 and 130. In that case, there is a reversal in the direction of the flux within the core.

In a manner to be described hereinafter, each one of the two cores of each memory device is preset to an initial flux density condition at a predetermined point (point one) on its hysteresis loop at the beginning of each field-trace interval. The pulses of curves H–N are applied to the "ring" windings with a polarity (illustrated as a negative pulse 121 below loop 120) tending to restrain the flux density condition from changing. As may be observed in loop 120, applying a negative pulse to any of the input windings (93) effects no net change in the flux density condition in view of the unidirectional characteristic of the hysteresis loop as indicated by the arrows. The H point merely travels out to point four and returns to point one, with no appreciable change in B.

In order to store successfully the encoding information as determined by counting mechanism 15, slow timing pulse generator 25 receives the pulses of curve G and develops at each one of its six output circuits selected ones of the pulses of curve G as represented by waveforms P–U respectively. The pulses of curve P–U are applied to the "slow" input circuits 71–76 coupled to the memory devices in columns A–F respectively. Thus, for each cycle of operation of the system, which is shown as occurring during each field trace, each column of memory devices receives one slow timing pulse in a predetermined sequence with respect to the other columns, whereas the various rows are actuated in a random sequence with each row receiving up to six "ring" pulses or none at all.

Although the application of the negative pulses of curves H–N alone over "ring" input circuits 51–56 has no effect, the positive pulses of curves P–U have a very definite effect on the core of transformer 90 and the corresponding transformers of the other memory devices. When a positive pulse of sufficient magnitude is applied to the "slow" input circuit (winding 92) of any of the memory devices, as for example pulse 123 in Figure 6, the flux density condition varies from point one to point two and thence to point three. There is a net change in flux density which gives rise to an induced current in winding 91. Thus, if the effect of all the pulses of curves H–N, only one of which is shown as pulse 121 in Figure 6, is disregarded for the moment, it will be appreciated that in response to the periodic occurrence of the pulses of curves P–U over a cycle of operation the flux density condition of each one of the cores of the input transformers is varied from point one to point three.

Consideration will now be given to the effect of the negative pulses of curves H–N. These pulses are applied with a greater magnitude than the positive pulses of curves P–U, as illustrated by the relatively larger pulse 121 as compared with pulse 123; consequently each time a pulse of curves H–N occurs in time coincidence with one of the pulses of curves P–U, the negative pulse 121 more than balances out the positive pulse 123 so that the flux density of the core effected is prevented from changing from point one to point three on hysteresis loop 120. This is very conveniently shown in connection with loop 120 where it may be seen that when positive pulse 123 from curves P–U occurs in time coincidence with negative pulse 121 from curves H–N, a net negative pulse causes the coercive force (H point) to vary from point one to point five and back to point one again, with no change in flux density.

Thus, as the code signal generator advances through one complete cycle of operation, during the time interval from one field-drive pulse to the next, each column of memory devices is actuated in sequence and the flux density condition of each of the cores of the input transformers is varied, with the exception of those memory devices which in addition to receiving a pulse over one of the "slow" input circuits 71–76 also receives a pulse over one of the "ring" input circuits 51–56. In those cases, the flux density condition remains at point one on the associated hysteresis loop 120. During a cycle of operation, the flux density condition changes in at least thirty of the thirty-six memory devices and remains unchanged in the rest. For example, during the cycle from the first field-drive pulse in curve A to the second, the following memory devices remain unaltered due to the effect of the pulses of curves H–N occurring during the cycle: A6, B1, D4, E2 and F2.

For all the various input transformers that have been actuated, the change in flux density from point one to point three on loop 120 results in the development of a pulse by induction in the associated output winding 91. Each one of the induced pulses is transferred via a diode 95 to the input winding 98 of the associated output transformer 100. Each of these latter pulses is applied with a positive polarity as indicated by pulse 124 below loop 130 in Figure 6 so that the flux density condition varies from point one to point two and then to point three on loop 130. Of course, all of the output transformers of the memory devices actuated by pulses from curves H–N remain in their respective reference conditions (namely, point one). Thus, at the conclusion of one cycle of operation the input and output transformers 90 and 100 of at least thirty memory devices are positioned opposite to their reference points, whereas the input and output transformers 90 and 100 of six memory devices or less are maintained in their reference conditions. It will be remembered that inasmuch as ring counter 15 has seven operating conditions but only six output circuits, there is a possibility that during the occurrence of some of the pulses of curves P–U no pulse occurs in any of curves H–N, resulting in the storage of no information at that time. Thus, during some cycles the transformers 90 and 100 of less than six memory devices remain in their reference conditions. The storage matrix has now stored six "bits" of information, considering the storage of no information whatsoever during the occurrence of one of the pulses of curves P–U as constituting one "bit."

In the aforementioned Bridges application, as well as in other copending applications such as Serial No. 370,174, filed July 24, 1953, and issued October 27, 1959, as Patent 2,910,526, in the name of Walter S. Druz, and Serial No. 366,727, filed July 8, 1953, and issued September 16, 1958, as Patent 2,852,598, in the name of Erwin M. Roschke, both of which are assigned to the present assignee, individual combinations of code signal components are preferably utilized during each field-retrace interval. In such systems, it is expedient to read out the stored "bits" of information rather rapidly in order to produce a complete combination of code signal components during a field-retrace interval. To this end, field-drive pulses are supplied to mono-stable multivibrator 29 which produces a series of elongated pulses (curve V) for application to mono-stable multivibrator 28 which operates in response to the trailing edge of each pulse of curve V to develop the pulses shown in curve W. It should be noted that for convenience of illustration the waveforms of the curves of Figure 4 have an expanded time scale as compared to Figure 3, and in order to depict an equal number of field-trace intervals the curves of Figure 4 have been broken at two points. The circuit parameters of multivibrator 29 are so chosen that the trailing edge of each pulse of curve V occurs immediately subsequent to the second series of equalizing pulses superimposed on the vertical blanking pulse, namely during the post-equalizing pulse portion of the vertical blanking interval, otherwise referred to as the "back porch" of the field-blanking pedestal. The circuit parameters of multivibrator 28 are so selected that the duration of each pulse of curve W overlaps or embraces in point of time six line-drive pulses occurring on the vertical "back porch."

The pulses of curve W, which serve as a gating signal, are applied to normally-closed gate circuit 27. Meanwhile, line-drive pulses from synchronizing-signal generator 10 (curve X) are supplied through a delay line 17 to form the pulses shown in curve Y. These latter pulses are supplied to gate circuit 27, but only the delayed line-drive pulses occurring within the intervals of the pulses of curve W are gated in to develop the pulses shown in curve Z at the output terminals. The pulses of curve Z are supplied to fast-timing pulse generator 26 which operates in a similar manner as generator 25 to produce the corresponding pulses of curves AA–FF on respective "fast" input circuits 81–86 of matrix 30.

The pulses of curves AA–FF are applied to the input windings (99) of the output transformers (100) of the memory storage devices in columns A–F respectively. These pulses are of positive polarity as illustrated, and if the cores of the output transformers (100) are established at point one on their respective hysteresis loops (130), the positive pulse will alter that flux density condition from point one to point two and then back to point three. It will be remembered that during the field-trace interval preceding each combination of line-drive pulses shown in curve Z, storage matrix 30 has stored six "bits" of information. Up to six output transformers (100) will be maintained in their reference flux density condition (point one) whereas the flux density in the cores of at least thirty output transformers (100) will already have been changed from point one to point three. Therefore, upon application of the read-out pulses of curves AA–FF, at least thirty of the memory devices will be unresponsive, but the cores of the remaining storage devices will be actuated. Altering the flux density condition from point one to point three on hysteresis loop 130 results in a pulse of current being induced in output winding 97 which is applied through diode 101 to the associated one of output circuits 61–66. Output circuits 61–66 are connected to respective samplers 31–36 to actuate associated code burst generators 37–42 respectively. Sampler circuits 31–36 are provided so that only output pulses corresponding to the read-out pulses of curve Z may be applied to generators 37–42; each time winding 98 receives a pulse when information is read or stored into storage matrix 30 a spurious output pulse may be produced in the associated output winding 97. By employing sampling circuits that are only turned on or gated open in synchronism with the read-out pulses, false operation of the generators in response to such spurious output pulses is precluded.

Considering now specifically the second combination of storage apparatus read-out pulses in curve Z, for example, and referring to the pulses of curves H–N occurring between the first two field-drive pulses of curve A, it will be seen that in response to the first read-out pulse of the second combination in curve Z, which is shown as pulse 127 in curve AA and is applied to all windings 99 of memory storage devices A1–A6, the core of output transformer 100 of memory device A6 will be affected to develop pulse 126 of curve MM an output circuit 66 and also at the output terminals of sampler 36 since that sampler is gated on at that instant by one of the pulses of curve Z; no output pulses are produced by any of the other memory devices of column A since the readout pulses find them already in the second or opposite flux density condition. In response to the second pulse of the second combination shown in curve Z, which is shown as pulse 128 of curve BB and is applied to all windings 99 of memory devices B1–B6, the core of output transformer 100 of memory device B1 which is conditioned at point one of its hysteresis loop 130 will be changed to point three to produce the output pulse 134 of curve GG on output circuit 61 and also at the output circuit of sampler 31. The third pulse of the second combination of curve Z, which is shown as pulse 129 in curve CC, is applied to memory devices C1–C6 and since each of the cores of the associated output transformers 100 has been actuated from its reference saturation condition to its opposite saturation condition, no pulse is developed on any of output circuits 61–66. In response to the fourth pulse of the second combination of curve Z, which is shown as pulse 130 in curve DD, the core of output transformer 100 in memory device D4, which is the only one which has not already been changed from point one to point three on its hysteresis loop, is changed at this time, resulting in the development of the pulse 133 of curve KK on output circuit 64 and also on the output circuit of sampler 34. The fifth pulse of the second combination of curve Z, which is shown as pulse 131 in curve EE, is applied to all windings 99 of memory devices E1–E6, and since the flux density condition of the core of output transformer 100 of memory device E2 has not already been changed from saturation in one direction to saturation in the other, the pulse 135 of curve HH is produced on output circuit 62 and also at the output terminals of sampler 32. Finally, in response to the last pulse of the second combination of curve Z, which is shown as pulse 132 in curve FF, the core of output transformer 100 in memory device F2 is effected to produce the pulse 136 of curve HH on output circuit 62 and also at the output terminals of sampler 32.

Thus, it has been shown that during the read-out process of storage matrix 30, the pulses of curves GG–MM are applied to signal generators 37–42 and during the occurrence of the second combination in curve Z, pulse 126 is initially applied to generator 42 to produce the burst of frequency $f_6$ (curve NN), pulse 134 is applied to generator 37 to produce frequency burst $f_1$, pulse 133 is applied to generator 40 to produce frequency burst $f_4$, and pulses 135 and 136 are applied to generator 38 to produce the two $f_2$ pulses. It should be apparent that each combination of curve NN comprises a plurality of code signal components or code bursts which individually have a predetermined identifying frequency and which collectively determine a code schedule in accordance with their occurrence and distribution within the combination. The code signal components of curve NN are applied to unit 43 which effectively codes the television signal, as for example in the manner shown and described in any of the aforementioned copending applications.

It will be recalled that the pulses illustrated in curves H–N between any two successive field-drive pulses of curve A (for example, between the first two) collectively constitute a first encoding signal developed during a field-trace interval and representing predetermined coding information. It should now be apparent that the pulses of curves GG–MM occurring during the second combination of curve Z (namely, 126, 133–136) collectively constitute a second encoding signal developed during a subsequent field-retrace interval and containing the same predetermined coding information. This second encoding signal is converted into code bursts by means of generators 37–42 and supplied to the coding apparatus in unit 43 to effect actuation thereof in accordance with this predetermined coding information to encode the intelligence or television signal.

As mentioned hereinbefore, it is necessary to preset each of the cores of the various magnetic memory devices by magnetizing them to an initial flux density condition at a predetermined point (point one) on the hysteresis loop at the beginning of each field-trace period. This is achieved by applying field-drive pulses to mono-stable multivibrator 23 which produces in response to each applied pulse the elongated pulses shown in curve QQ, the trailing edge of each pulse occurring immediately succeeding the last pulse in each code signal combination of curve NN. Mono-stable multivibrator 24 is actuated in response to the trailing edge of each pulse of curve QQ to produce the negative pulses of curve RR for application over "reset" input circuit 50 to all windings 93 and 98 of all of the memory devices. These negative pulses magnetize all of the cores of the reference flux density condition (point one) on their respective hysteresis loops. The encoding signal generator is thus conditioned for storage of information during the immediately succeeding field-trace interval and for subsequent reading-out of that information during the succeeding field-retrace interval.

By way of summary, ring counter 15 constitutes a mechanism which is actuated sequentially between a multiplicity of stable operating conditions in response to an applied actuating signal. Noise generator 16 produces a random actuating signal which is applied to mechanism 15 during each of a series of spaced predetermined trigger-time intervals, determined by 6:1 frequency multiplier 13 and gate circuit 14, to effect actuation of mechanism 15 between its multiplicity of operating conditions for establishing it in a randomly selected operating condition at the termination of each trigger time interval. Generators 37–42 constitute a plurality of signal generators for individually producing a signal having a predetermined identifying characteristic. Finally, samplers 17–22, storage matrix 30, slow timing pulse generator 25, fast timing pulse generator 26, samplers 31–36 and the necessary coupling circuitry constitute means coupled to mechanism 15 and to the plurality of signal generators 37–42 for actuating a randomly selected one of the generators in accordance with the operating condition of mechanism 15 at the termination of each of the predetermined trigger-time intervals.

In previous subscription television systems, such as that shown in the aforementioned Druz application Serial No. 370,174, the television signal is coded not only by the various combinations of code bursts of the type developed by the encoding signal generator of Figure 1 during the field-retrace intervals but also by periodically recurring pulses which preferably are developed throughout the field-trace periods. Such operation effects very complex faster-than-field coding, that is, coding of some characteristic of the television signal at intervals occurring more frequently than image field intervals. One way of achieving this conjoint operation is by utilizing, in addition to the code signal components of the type developed by the generator of the present application, a series of periodically recurring output pulses from a counting device such as a blocking oscillator or a binary counting chain synchronized by line-drive pulses. Pulses from the counting device as well as pulses derived from the code signal components may all be supplied to the coding apparatus. However, when this arrangement is employed, it is desirable to interrupt the operation of the counting device at the receiver or to synchronize the operation of the counter at the transmitter so that pulses from that device do not occur in time coincidence with any of the pulses from the code combinations, to avoid possible ambiguity or instability attributable to simultaneous application of actuating pulses from the two sources. If the counting devices are disabled at the receiver, additional gating circuitry is required. On the other hand, if the output of the counting device and the code combinations are synchronized at the transmitter the counting device output pulses always occur at corresponding times in every field-trace interval; this definitely limits the picture scrambling complexity.

In accordance with a feature of the present invention, the periodically recurring components are permitted to occur at different times during each field-trace interval to increase the coding complexity and yet the only circuitry required to avoid interference between the periodically recurring components and the code signal components is located at the transmitter. This is realized in the arrangement shown in Figure 7 by employing a counting device shown as a 5:1 blocking oscillator 103 connected to synchronizing-signal generator 10 to receive line-drive pulses therefrom. These pulses, which are shown in a partial reproduction of curve X in Figure 8, are effectively divided in blocking oscillator 103 to develop the pulses of curve SS which are applied to the coding apparatus of unit 43 to achieve coding in the same manner as shown in the aforementioned Druz application. In order to insure that no pulse in curve SS occurs in coincidence with a pulse from the code signal generator of Figure 1, the pulses of curve SS are also applied to a mono-stable multivibrator 104 to develop the positive elongated pulses of curve TT. A gate circuit 105 is of the normally-closed type and is opened in response to each positive pulse of curve TT to supply the bursts from generators 37–42, shown in curve NN, to the television transmitter and coding apparatus 43.

The first combination of curve NN has been shown in Figure 8 as curve UU to illustrate the manner in which only the bursts occurring during the positive pulses of curve TT are permitted to actuate unit 43. It will be seen that the third burst of the first combination of curve NN, which happens to be a burst of $f_4$ frequency, has been deleted or gated out in curve UU since gate circuit 105 is in its closed condition upon receipt of that $f_4$ burst. The combination of curve UU is applied to unit 43 along with the pulses of curve SS, and inasmuch as no pulse of curve UU occurs in time coincidence with pulse 138 of curve SS, the coding apparatus in unit 43 is operated without any interference between applied pulses. Of course, in this case only the combination of curve UU is transmitted to the subscribers, either as an additional modulation component of the television signal or on a separate channel such as a wire conductor. At authorized receivers, counting devices corresponding to unit 103 are operated in synchronism and since no pulse from that counting mechanism occurs in time coincidence with any of the pulses of the code signal combination, interference or ambiguity in the operation of the decoding apparatus is effectively precluded.

Thus, it will be appreciated that blocking oscillator 103 develops a series of periodically recurring signal components and generators 37–42 develop combinations of code signal components variably phased with respect to the periodically recurring components, certain ones of the code components occurring substantially in time coincidence with components of the series developed by the blocking oscillator. It will further be appreciated that mono-stable multivibrator 104 and gate circuit 105 utilize the periodically recurring signal components for effectively removing these certain ones of the code signal components from the combinations. Unit 43 utilizes the periodically recurring components from blocking oscillator 103 and also the combinations of code signal components from generators 37–42, minus those certain ones which have been deleted, in order to code the television signal.

In numerous subscription television systems such as those described in the above-identified copending Druz application, counting devices are employed at the transmitter and at authorized subscriber receivers to develop a series of periodically recurring signal components for coding and decoding purposes. These counting devices have to be maintained in step and to this end reset pulses are usually developed and utilized at the transmitter and at the receivers at convenient intervals. To add to the coding complexity, it has been found desirable to reset the counting devices at random and in a manner known only to subscriber receivers. However, when a counting device such as a blocking oscillator is reset during the early stages of its complete cycle of operation, unstable operation may result. For example, if a 5:1 blocking oscillator actuated by line-drive pulses is employed, it has been found that any attempt to reset the blocking oscillator immediately after it has produced a pulse or during the first two steps in its five-step cycle may result in unstable or inaccurate resetting. Therefore, in accordance with a further feature of the present invention, the output pulses from the multi-step counting device are utilized to control the effectiveness of the randomly occurring reset pulses in order to insure that no reset pulse is applied to the counting device during certain steps of its cycle.

Figure 7:
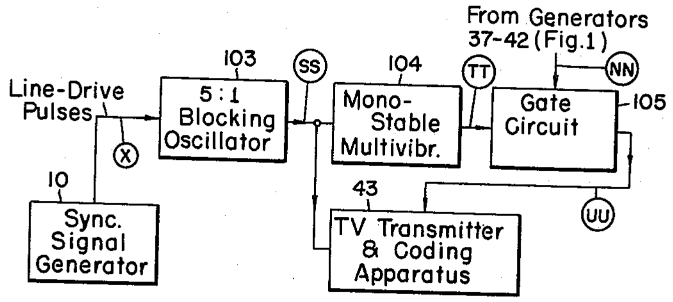
Figure 7 is a schematic diagram of a portion of a subscription television transmitter illustrating another aspect of the invention.
Figure 8:
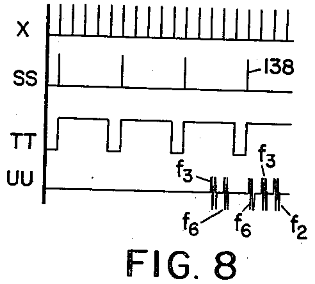
Figure 8 is a graphical representation of a series of waveforms useful in explaining the operation of the system of Figure 7.
Figure 9:
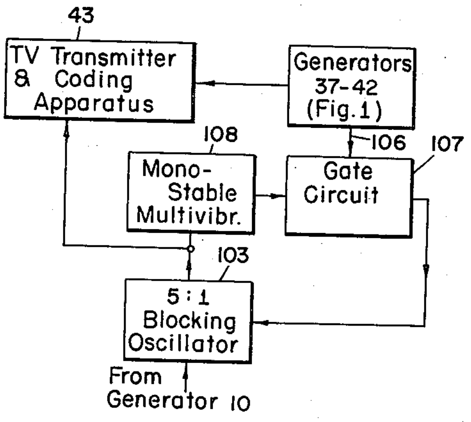
Figure 9 is a schematic diagram of a portion of a subscription television transmitter illustrating a further aspect of the invention.

An arrangement for achieving this result is shown in Figure 9 wherein the output pulses of counting device 103 are applied not only to the television transmitter and coding apparatus 43 as in the arrangement of Figure 7, but also to a mono-stable multivibrator 108 which produces, in response to each output pulse from blocking oscillator 103, a negative pulse having a duration embracing two line-trace intervals. These latter pulses are applied to a normally-open gate circuit 107, which is supplied with randomly occurring reset pulses over a conductor 106, to close the gate during the negative pulse intervals. Conductor 106 may, for example, be connected to any one of the generators 37–42 and since those generators are each operated in a random fashion the particular generator used may be considered as a source of reset pulses. Thus, if any pulses over conductor 106 happen to occur during the first two line traces succeeding an output pulse from multi-step blocking oscillator 103, namely during the first two steps in the five-step operating cycle of blocking oscillator 103, that reset pulse will be rendered ineffective for reset purposes since it will not be permitted to pass through gate circuit 107.

In short, blocking oscillator 103 constitutes a multi-stable counting device which is responsive to each series of applied pulses for executing a complete cycle of operation to produce an output pulse. A series of pulses are applied to counting device 103 from generator 10. The reset signal source (namely, one of generators 37–42) develops randomly occurring reset pulses for resetting the counting device to a predetermined reference operating step. Finally, multivibrator 108 and gate circuit 107 constitute means for utilizing each output pulse from counting device 103 to render any of the reset pulses from source 106 occurring during certain ones of the operating steps ineffective.

Viewed from a different aspect, the secrecy communication system shown in Figure 9, which is embodied in a subscription television transmitter, comprises an encoding mechanism for varying the operating mode of the system in accordance with a predetermined code schedule. This mechanism includes blocking oscillator 103, the coding apparatus portion of unit 43 and generators 37–42. The system has a source of code signal components which may be considered the particular one of generators 37–42 connected to conductor 106. Translating means, which is constituted by gate circuit 107, has a plurality of translating conditions and is coupled to source 106 and to the encoding mechanism, specifically to blocking oscillator 103. Finally, the secrecy communication system comprises means, such as mono-stable multivibrator 108, which is coupled to the encoding mechanism and to translating means 107, for varying the translating condition of the translating means in accordance with a predetermined schedule.

Viewing the embodiment of Figure 9 from a still different aspect, a plurality of code signal components are developed in the generator connected to conductor 106, and a control effect is developed at the output of gate circuit 107 in response to certain ones only of the code signal components. The intelligence or television signal is encoded (by means of blocking oscillator 103, which may be termed a control or actuating mechanism, and the coding apparatus in unit 43) at least in part in accordance with this control effect. A modifying signal is derived from control mechanism 103 (by means of multivibrator 108) at least partly in response to this control effect and represents a selecting schedule; certain ones of the code signal components appearing on conductor 106 are selected by gate circuit 107 in response to the modifying signal.

Certain features described in the present application are disclosed and claimed in copending application Serial No. 463,700, filed October 21, 1954, and issued July 21, 1959, as Patent 2,896,193 in the name of Richard C. Herrmann; copending application Serial No. 700,854, filed December 5, 1957, in the name of Myron G. Pawley et al., constituting a divisional application of copending application Serial No. 230,618, filed June 8, 1951, and issued December 10, 1957, as Patent 2,861,156; and also copending application Serial No. 310,309, filed September 18, 1952, in the name of Alexander Ellett, all of which are assigned to the present assignee.

While particular embodiments of the invention have been shown and described, modifications may be made, and it is intended in the appended claims to cover all such modifications as may fall within the true spirit and scope of the invention.

We claim:

1. A method of translating a composite television signal including video-signal components in recurring trace intervals and synchronizing-signal components in intervening retrace intervals, the steps comprising: developing during one of said trace intervals a first encoding signal representing predetermined coding information; storing said coding information during said last-mentioned trace interval; reading out the stored coding information during one of said retrace intervals subsequent to said last-mentioned trace interval to derive a second encoding signal containing said coding information; and utilizing said second encoding signal to vary the operating mode of said television signal in accordance with said coding information effectively to encode said television signal.

2. A method of translating a composite television signal comprising the steps of: developing a series of first encoding signals individually representing different coding schedules and individually occurring within successive ones of a series of storing time intervals; storing said coding schedules during said storing time intervals; reading out the stored coding schedules during each of a series of intervening read-out time intervals individually having a duration short relative to that of each of the said storing time intervals to derive a series of second encoding signals each of which represents the coding schedule of the first encoding signal occurring within the immediately preceding storing time interval; and utilizing said second encoding signals to vary the operating mode of said television signal in accordance with said coding schedules effectively to encode said television signal.

3. A method of translating an intelligence signal which comprises: developing a plurality of code signal components; developing a control effect in response to certain ones only of said code signal components; encoding said intelligence signal in accordance with said control effect; developing from said control effect a modifying signal representing a selecting schedule; and selecting said certain ones of said code signal components in response to said modifying signal.

4. A method of translating an intelligence signal which comprises: developing a plurality of code signal components; developing in response to certain ones only of said code signal components a control signal having characteristic variations representing a predetermined code schedule; encoding said intelligence signal in response to said control signal; developing a modifying signal having characteristic variations representing a selecting schedule related to said predetermined code schedule; and selecting said certain ones of said code signal components in response to predetermined characteristic variations of said modifying signal.

No references cited.